United States Patent
Campà Anfruns et al.

(10) Patent No.: US 9,609,886 B2
(45) Date of Patent: Apr. 4, 2017

(54) METHOD AND PACKAGING WHOLE KERNELS

(71) Applicant: DODE, S.A., San Cugat del Vallés (ES)

(72) Inventors: Jordi Campà Anfruns, San Cugat del Vallés (ES); Salvador Montagut Sala, San Cugat del Vallés (ES)

(73) Assignee: Dode, S.A., San Cugat del Valles (ES)

( * ) Notice: Subject to any disclaimer, the term of this patent is extended or adjusted under 35 U.S.C. 154(b) by 0 days.

(21) Appl. No.: 14/391,232

(22) PCT Filed: Apr. 15, 2013

(86) PCT No.: PCT/ES2013/070239
§ 371 (c)(1),
(2) Date: Oct. 8, 2014

(87) PCT Pub. No.: WO2014/170507
PCT Pub. Date: Oct. 23, 2014

(65) Prior Publication Data
US 2015/0374016 A1    Dec. 31, 2015

(51) Int. Cl.
| | |
|---|---|
| *A23L 1/18* | (2006.01) |
| *A23J 7/00* | (2006.01) |
| *B65B 29/08* | (2006.01) |
| *B65B 63/08* | (2006.01) |
| *A23L 29/10* | (2016.01) |
| *A23L 7/161* | (2016.01) |

(52) U.S. Cl.
CPC . *A23L 1/18* (2013.01); *A23J 7/00* (2013.01); *A23L 7/161* (2016.08); *A23L 29/10* (2016.08); *B65B 29/08* (2013.01); *B65B 63/08* (2013.01); *A23V 2002/00* (2013.01)

(58) Field of Classification Search
CPC ............................. A23L 1/817; A23L 1/1812
USPC .. 426/93, 242, 309, 325, 291, 292, 629, 639
See application file for complete search history.

(56) References Cited

U.S. PATENT DOCUMENTS

| | | | | |
|---|---|---|---|---|
| 3,445,988 | A | * | 5/1969 | Jehn .......................... B65B 1/04 413/45 |
| 5,443,858 | A | * | 8/1995 | Jensen .................. A23L 1/1812 426/241 |
| 2013/0149419 | A1 | * | 6/2013 | Luhadiya ................ A23L 1/035 426/250 |

* cited by examiner

*Primary Examiner* — Helen F Heggestad
(74) *Attorney, Agent, or Firm* — Ladas & Parry LLP

(57) ABSTRACT

A method for the packaging of popcorn kernels for popping in microwave ovens, in which the method comprises a stage of the dispensing popcorn kernels, a distribution agent, and a flavoring agent into a microwaveable package through an arrangement of independent discharge openings, adapted to supply and dose, respectively, the popcorn kernels, distribution agent, and flavoring agent.

16 Claims, No Drawings

METHOD AND PACKAGING WHOLE KERNELS

RELATED APPLICATION INFORMATION

This application is a 371 of International Application PCT/ES2013/070239 filed 15 Apr. 2013 entitled "Method And Packaging Whole Kernels", the content of which is incorporated herein by reference.

PURPOSE OF THE INVENTION

This invention refers to a method for packaging kernels of corn for popping in microwave ovens.

STATE OF THE ART

The packaging of previously-flavoured kernels of corn in a microwaveable bag is known in the state of the art.

Generally, the process of flavouring kernels of corn comprises the stages of applying an adhesive liquid and flavouring agent over the kernels of corn in order to form a layer of flavouring that coats the outer wall of the kernels.

This type of process results in a kernel of corn coated with a uniform layer of coating that is strongly adhered to the kernel and which persists during the packaging phase and during the popping phase in the microwave oven, to obtain directly-flavoured popped kernels.

As a result, the process of flavouring the of corn kernels is complex and increases the final cost of the bag of kernels of corn for popping in microwave ovens.

SUMMARY

This invention seeks to resolve one or more of the aforementioned disadvantages by using a method for packaging kernels of corn for popping in microwave ovens as claimed in the claims.

One objective is to provide a method for packaging kernels in a microwaveable package, in which the popcorn kernels, a flavouring agent, and a distribution agent are dosed and packaged independently from each other.

Consequently, the process of packaging the kernels of corn is fast and simple, because it makes it unnecessary to apply a flavouring stage of the kernel of corn before dispensing and packaging in the microwaveable bag is unnecessary.

The kernels of corn are therefore flavoured during the process of popping the kernels when heat is applied to them inside the bag. The distribution agent serves as a vehicle for the adhesion of the flavouring agent to the popcorn kernels when they pop, resulting in popped kernels that are flavoured directly by a layer of flavouring that adheres directly to the popped kernels, with an optimum level of flavour.

The distribution agent is an emulsion or mixture of at least two emulsifying or emulgent food additives, that uniformly distributes and causes the flavouring agent to adhere to the popped popcorn kernel during the popping stage. Consequently, the presence of the distribution agent in the bag avoids the dispensing and packaging of grease or oil in which the flavouring agent is suspended.

The distribution agent is a mixture of emulsifier and lecithin. The emulsifier is an E-471 emulsifier and the lecithin is a sunflower lecithin or higholeic sunflower lecithin, or similar lecithin.

The lecithin stabilises the emulsifier and distributes the emulsifier and flavouring agent evenly on the surface of all of the popped kernels. Consequently, the emulsifier acts as an adhesive agent that causes the flavouring to adhere to the popped kernels.

The flavouring agent may be salt, kitchen salt, butter, sugar, or sweetener. The flavouring agent is added to the bag in solid form, preferably as a powder; liquid, etc.; in other words, the state in which the flavouring agent is packaged will depend on the type of flavouring agent used to add flavour to the popcorn kernels.

In summary, the short period of time required by the process of popping the kernels is sufficient to secure an adhesive layer of flavouring in optimum conditions for consumption of the popcorn, so the flavouring process is very fast, and does not require any additional grease or oil beyond that which may be present naturally in the flavoring agent when butter is used for this purpose.

The kernels of corn are packaged without the presence of grease or oil, which avoids the need to use specific packaging that is resistant to contact with grease or oil, or to apply a grease-resistant treatment to prevent the oil or grease from soaking through to the outside of the package. For example, the packaging can be made of flexible microwaveable paper. The packaging can be made out of a wide variety of materials.

The absence of oil or grease used to add flavour to the popped kernels produces popcorn that is low in calories.

The distribution agent adds a degree of palatability to the flavoured popcorn that makes it pleasant to eat; in other words, the distribution agent lubricates the flavoured popped kernels and facilitates swallowing.

The distribution agent is in solid state inside the package due to its high melting point.

The method also comprises a stage of packaging the dried and flavoured kernels in a flexible microwaveable paper bag.

DESCRIPTION OF AN EMBODIMENT

The method of packaging kernels of corn comprises the stages of taking a package from a stack of stored packages, opening the package, and moving it to a packaging zone or a zone for filling it with the products to be packaged into the package.

Once the package is in the product loading zone, an arrangement of discharge openings dispenses raw kernels of corn a distribution agent and a flavouring agent. In other words, the kernels do not undergo any type of pre-processing.

The filled package then moves to a sealing area where the package is sealed. The package of microwaveable kernels of corn is then packaged with other packages for later distribution.

The packaging method is carried out by a packaging machine that packages a controlled and dosed quantity of kernels of corn, a distribution agent, and a flavouring agent, in the absence of added oil or grease, inside a flexible microwaveable paper bag.

The flavouring agent is supplied in solid state through the corresponding discharge opening, generally in the form of a powder inside the package.

The flavouring agent is salt, kitchen salt, butter, sweetener, sugar, different types of colourings in alcohol, etc. Some types of flavouring agents must be supplied in a state other than solid state.

The distribution agent is a homogeneous mixture that includes food additives selected from emulsifiers and lecithin. The emulsifier itself acts as the coating and support agent for the flavouring agent; in other words, the emulsifier is an adhesive to cause the flavouring agent to adhere to the popped kernel; and the lecithin acts as a homogenizer, uniformly distributing the adhesive and flavouring among all of the kernels of corn.

The emulsifier is an E-471 type emulsifier that includes mono- and diglycerides of fatty acids.

The lecithin is a sunflower lecithin or high-oleic sunflower lecithin. The sunflower lecithin is a phospholipid (phosphatidylcholine, phosphatidylethanolamine, phosphatidylinositol, and phosphatidic acid); in other words, the sunflower lecithin acts as a phosphoaminolipid.

Due to the viscosity of the distribution agent, it is heated to a temperature between 50° C. and 60° C. to be added to the package from the corresponding discharge opening. However, the other elements dispensed inside the package are packaged at an ambient temperature between 20 and 30° C., for example, at 25° C.

In one implementation of the package for kernels of corn for popping in microwave ovens, the weight of the closed package is less than or equal to 75 g, of which 70.4 g by weight corresponds to the kernels of corn; 1.5 g by weight corresponds to the emulsifier; 0.1 g corresponds to the lecithin, and 3 g corresponds to kitchen salt as a flavouring agent.

The distribution agent includes a proportion by weight of emulsifier that is less than or equal to 2% of the total weight of the package of microwaveable kernels of corn before the kernels are popped; and the weight of the lecithin is less than or equal to 0.13% of the total weight of the package of microwaveable kernels of corn before the kernels are popped.

The flavouring agent includes a proportion of the package by weight of between 3 and 4% of the total weight of the package of microwaveable popcorn kernels before the kernels are popped.

The concentration of the flavouring agent with which the kernels of corn is to be flavoured and the phase in which the flavouring is packaged depend on the type of flavouring and the desired intensity of the flavour in the final product, popcorn.

The invention claimed is:

1. A method for the packaging of kernels of corn for popping inside a microwave oven characterised in that the method comprises a stage in which kernels of corn, a distribution agent free of oil or fat, and a flavouring agent are dispensed separately into a microwaveable popcorn package through an arrangement of independent discharge openings, adapted to-provide respectively, the kernels of corn, distribution agent, and flavouring agent, and a stage for the mixture of food additives selected from among an emulsifier and a lecithin, wherein any said lecithin is added in an amount to provide less than 0.13% by weight of the microwaveable package and wherein no oils or fat are found in the composition.

2. Method in accordance with claim 1; characterised in that the method comprises a stage of heating the distribution agent to a temperature between 50° C. and 60° C. prior to the stage in which the distribution agent is added to the microwaveable popcorn package.

3. Popcorn obtained by the method according to claim 2; characterised in that the microwaveable package comprises a distribution agent that includes a mixture of food additives selected from among an emulsifier and a lecithin.

4. Method in accordance with claim 1; characterised in that the stage in which the distribution agent is added includes a proportion by weight of emulsifier that is less than or equal to 2% of the total weight of the package of microwaveable kernels of corn before the kernels are popped.

5. Method in accordance with claim 4; characterised in that the stage in which the distribution agent is supplied includes an emulsifier having mono and diglycerides of fatty acids.

6. Popcorn obtained by the method according to claim 4; characterised in that the microwaveable package comprises a distribution agent that includes a mixture of food additives selected from among an emulsifier and a lecithin.

7. Method in accordance with claim 4; characterised in that the stage in which the distribution agent is supplied includes a lecithin selected from among a sunflower lecithin or high-oleic sunflower lecithin.

8. Popcorn obtained by the method according to claim 5; characterised in that the microwaveable package comprises a distribution agent that includes a mixture of food additives selected from among an emulsifier and a lecithin.

9. Popcorn obtained by the method according to claim 7; characterised in that the microwaveable package comprises a distribution agent that includes a mixture of food additives selected from among an emulsifier and a lecithin.

10. Method in accordance with claim 1; characterised in that the stage for the addition of the flavouring agent, which is in powdered form, is carried out by applying the flavouring agent in question in the form of powder.

11. Popcorn obtained by the method according to claim 10; characterised in that the microwaveable package comprises a distribution agent that includes a mixture of food additives selected from among an emulsifier and a lecithin.

12. Method in accordance with claim 1; characterised in that the stage in which the flavouring agent is added includes a flavouring, selected from among kitchen salt, a sugar, a sweetener, butter.

13. Popcorn obtained by the method according to claim 12; characterised in that the microwaveable package comprises a distribution agent that includes a mixture of food additives selected from among an emulsifier and a lecithin.

14. Method in accordance with claim 12; characterised in that the stage in which the flavouring agent is added includes a proportion by weight of package of between 3 and 4% of the total weight of the package of microwaveable popcorn kernels before the kernels of corn are popped.

15. Popcorn obtained by the method according to claim 14; characterised in that the microwaveable package comprises a distribution agent that includes a mixture of food additives selected from among an emulsifier and a lecithin.

16. Popcorn obtained by the method according claim 1; characterised in that the microwaveable package comprises a distribution agent that includes a mixture of food additives selected from among an emulsifier and a lecithin.

* * * * *